United States Patent
Seger et al.

(10) Patent No.: US 8,836,786 B2
(45) Date of Patent: Sep. 16, 2014

(54) CAMERA FOR A VEHICLE

(75) Inventors: Ulrich Seger, Leonberg-Warmbronn (DE); Nikolai Bauer, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 417 days.

(21) Appl. No.: 13/079,107

(22) Filed: Apr. 4, 2011

(65) Prior Publication Data
US 2012/0075471 A1 Mar. 29, 2012

(30) Foreign Application Priority Data
Apr. 7, 2010 (DE) .................. 10 2010 003 666

(51) Int. Cl.
*H04N 7/18* (2006.01)
*B60R 11/04* (2006.01)

(52) U.S. Cl.
CPC ..................................... *B60R 11/04* (2013.01)
USPC ........................................................ 348/148

(58) Field of Classification Search
USPC ............................................... 348/148; 345/7
See application file for complete search history.

(56) References Cited

U.S. PATENT DOCUMENTS 3,665,826 A * 5/1972 Karpol ........................ 396/192
5,734,357 A * 3/1998 Matsumoto ....................... 345/7

2009/0046149 A1* 2/2009 Ohsumi et al. ................ 348/148
2009/0128629 A1* 5/2009 Egbert et al. .................. 348/148
2009/0135253 A1* 5/2009 Augst ........................... 348/148

FOREIGN PATENT DOCUMENTS

| DE | 10310264 | 9/2004 |
|---|---|---|
| DE | 10323560 | 12/2004 |
| DE | 102004056349 | 5/2006 |
| DE | 102005000650 | 7/2006 |
| DE | 102005043411 | 3/2007 |
| DE | 10 2009 027 512 | 1/2011 |
| EP | 1580092 | 9/2005 |

* cited by examiner

*Primary Examiner* — Sath V Perungavoor
*Assistant Examiner* — Peter D Le
(74) *Attorney, Agent, or Firm* — Kenyon & Kenyon LLP

(57) ABSTRACT

A camera for a vehicle is described. The camera has at least one optoelectronic image converter, a camera housing in whose interior the image converter is accommodated, a camera optical element, which is accommodated in an optical mounting reference surface of the camera housing and is provided for imaging a primary detection area on the image converter, and a camera position reference surface for positioning the camera in relation to a vehicle window. At least one receiving surface for at least one light-guiding device e.g., one or a plurality of mirrors, is formed on the camera housing for deflecting light from at least one additional detection area to the camera optical element. The optical mounting reference surface, camera position reference surface, and receiving surface are preferably formed on a single housing component, e.g., an upper shell.

12 Claims, 4 Drawing Sheets

CAMERA FOR A VEHICLE

CROSS REFERENCE

The present application claims the benefit under 35 U.S.C. §119 of German Patent Application No. 102010003666.8 filed on Apr. 7, 2010, which is expressly incorporated herein by reference in its entirety.

BACKGROUND INFORMATION

Various functions are covered in vehicles by optical image converters or image sensors, e.g., rain detection, window condition detection, tunnel detection, twilight detection, ambient brightness detection and sun position detection. Furthermore, sometimes complex video systems or cameras are provided for capturing the vehicle surroundings, in particular a driving scene ahead of the vehicle, for implementing driver assistance systems.

The various sensors and video systems must therefore be electrically contacted and accommodated in the vehicle in such a way that on the one hand, they are not covered and have an unobstructed view through a vehicle window pane, and on the other hand do not significantly obstruct the view of the driver. The use of a plurality of sensors thus results in considerable integration pressure in order to find a place for the sensors and cameras.

German Patent Application No. DE 103 10 264 A1 describes a catadioptric camera, in particular for a vehicle having an image sensor including a converter and an optical element. Optical radiation of the surroundings is reflected on at least one mirror before appearing on the image sensor, the mirror being situated separated from the image sensor, in particular on an add-on component of the vehicle such as, e.g., a third brake light.

German Patent Application No. DE 10 2005 000 650 A1 describes a camera system, the camera being situated in the mirror base of the rear view mirror fastened on the windshield and capturing an area of the surroundings ahead of the vehicle using a deflecting mirror. The placement in the mirror base thus makes it possible to reduce additional space requirements and additional costs for mounting the camera. European Patent No. EP 1 580 092 A2 describes a camera which uses the same image sensor for recording the vehicle surroundings through the window on the one hand and for recording the light radiated through the window for window surface detection on the other hand.

German Patent Application. No. DE 10 2004 056 349 A1 describe an image capturing system for a driver assistance system of a vehicle, in which a camera records light across a planar mirror and a curved mirror situated offset to it and thus captures different visual ranges. German Patent Application No. DE 103 23 560 A1 describes a camera which on the one hand directly covers a surrounding area of a vehicle and furthermore an area above the vehicle using a curved mirror.

German Patent Application No. DE 10 2005 043 411 A1 describes a stereo-optical system in which deflection mirrors deflect images from different detection areas onto a common image sensor.

Additional deflecting devices or light-guiding devices may thus enlarge the detection area of the camera and achieve additional functionalities. However, complex adjustments using additional adjustment devices are required in this case, since the additional light-guiding devices must be positioned precisely in relation to the camera and even minor deviations are capable of having considerable negative impact on the additional functionality

SUMMARY

According to an example embodiment of the present invention, one or a plurality of light-guiding devices, in particular mirrors, is provided on the camera housing itself. The light-guiding devices thus make it possible for the primary detection area formed by the image sensor and the camera optical element to be enlarged. The additional light-guiding devices thus preferably form at least one secondary optical element, via which the at least one secondary detection area is captured. One or a plurality of mirrors, for example, may thus be situated in the primary detection area which deflects the secondary detection area to the camera optical element.

An advantage according to the present invention is that the following functional elements are fastened to or formed on the camera housing, preferably even on a single housing component of the camera housing:

- camera position reference surfaces for the defined positioning of the camera in relation to the window, in particular for positioning the camera in a camera mount fastened to the window;
- an optical mounting reference surface or optical position reference surface via which the position and orientation of the camera optical element (lens unit) and thus also the optical axis are defined, and
- one or a plurality of receiving surfaces or receiving areas for the light-guiding devices, i.e., in particular for fastening the mirrors.

The camera position reference surfaces may ensure a precise positioning of the camera in relation to the window. The camera, including its camera position reference surfaces, may in particular be accommodated in a camera mount which is fastened, for example, on the inside of the window by a mounting plate. In this connection, the camera may be, for example, clipped in, i.e., accommodated in a snap-in receptacle of the camera mount.

The optical mounting reference surface or optical position reference surface may be, for example, a generally cylindrical lens unit mount or recess for the camera optical element or for a lens holder which holds the individual lenses.

The receiving surfaces or receiving areas for the light-guiding devices define the one or more secondary optical elements and in particular their adjustment in relation to the primary optical element, i.e., the camera optical element.

A significant advantage is thus that the relevant adjustments, i.e., the adjustment of the camera in relation to the window and the adjustment of the optical axis of the camera optical element in relation to the housing and the adjustment of the secondary optical elements or light-guiding devices in relation to the camera optical element (primary optical element), are all performed on the camera housing itself or by the shaping of the camera housing and thus no additional adjustment devices are necessary for adjusting two components in relation to one another, for example, a mount in relation to the housing.

According to a particularly preferred specific embodiment, these surfaces or areas of relevance for the adjustments may be formed on a single single-shell component or on a single out-of-tool component, in particular on the upper shell of the camera housing. These surfaces or areas are thus very precisely positioned in relation to one another without the need for additional adjustments later. The upper shell may, for example, be designed as an injection molded plastic part or a compression-molded plastic part, or as a die cast part, e.g., an aluminum die cast part. In such manufacturing methods, sufficiently low tolerances occur in the component, thus ensuring the required precision for the adjustment.

It is thus possible to ensure an exact positioning and optical adjustment already in the production process; a later change in the mounting or positioning in the vehicle is of no concern. The fastening of the upper shell to the lower shell for forming the entire camera housing is thus also relatively uncomplicated, since tolerances that may occur in this area no longer influence the functions determined by the upper shell.

The image converter is preferably fastened to a switching element which is also accommodated on the upper shell.

The use of a plurality of mirrors may, if necessary, enlarge the object width of the secondary optical element, which is formed from the secondary optical element and the camera optical element (primary optical element), in order, for example, to image an area in close proximity having greater object width.

In this connection, for example, relatively small sized mirrors may be fastened to the lower and/or lateral part of the primary detection area, these mirrors cooperating in each case with one or a plurality of additional mirrors which is, for example, provided in a rear area of the camera housing next to and/or behind the camera optical element.

The light-guiding devices form one or more secondary optical elements and make additional functions possible. For example, an outer side of the windshield to which the camera is fastened may be imaged in order to determine the window condition and to be able to detect, for example, wetness caused by water or other liquids, dirt, fogging, and/or icing. Another function provided in addition to or as an alternative to this may be to provide a blurred image of an area of the surroundings on the image converter, e.g., in order to measure an ambient brightness, a viewing direction upward or forward and upward being captured for this purpose.

The additional secondary optical elements may be designed simply as planar mirrors, or they may also change the focus or object width through the use of curved or concave mirrors.

In particular, two secondary optical elements may be formed to the left and right on the camera housing, a first mirror of which being situated to the left or right in the lower part of the primary detection area and recording light from a second mirror which is provided on the rear part of the camera housing to the left or right and determining the particular secondary detection area.

In principle, a secondary optical element may also perform a plurality of functions. For example, a first mirror may be provided in the primary detection area of the camera optical element, the mirror recording light from two additional mirrors for different functionalities or different viewing directions and secondary detection areas.

DETAILED DESCRIPTION OF EXAMPLE EMBODIMENTS

Figure 1:
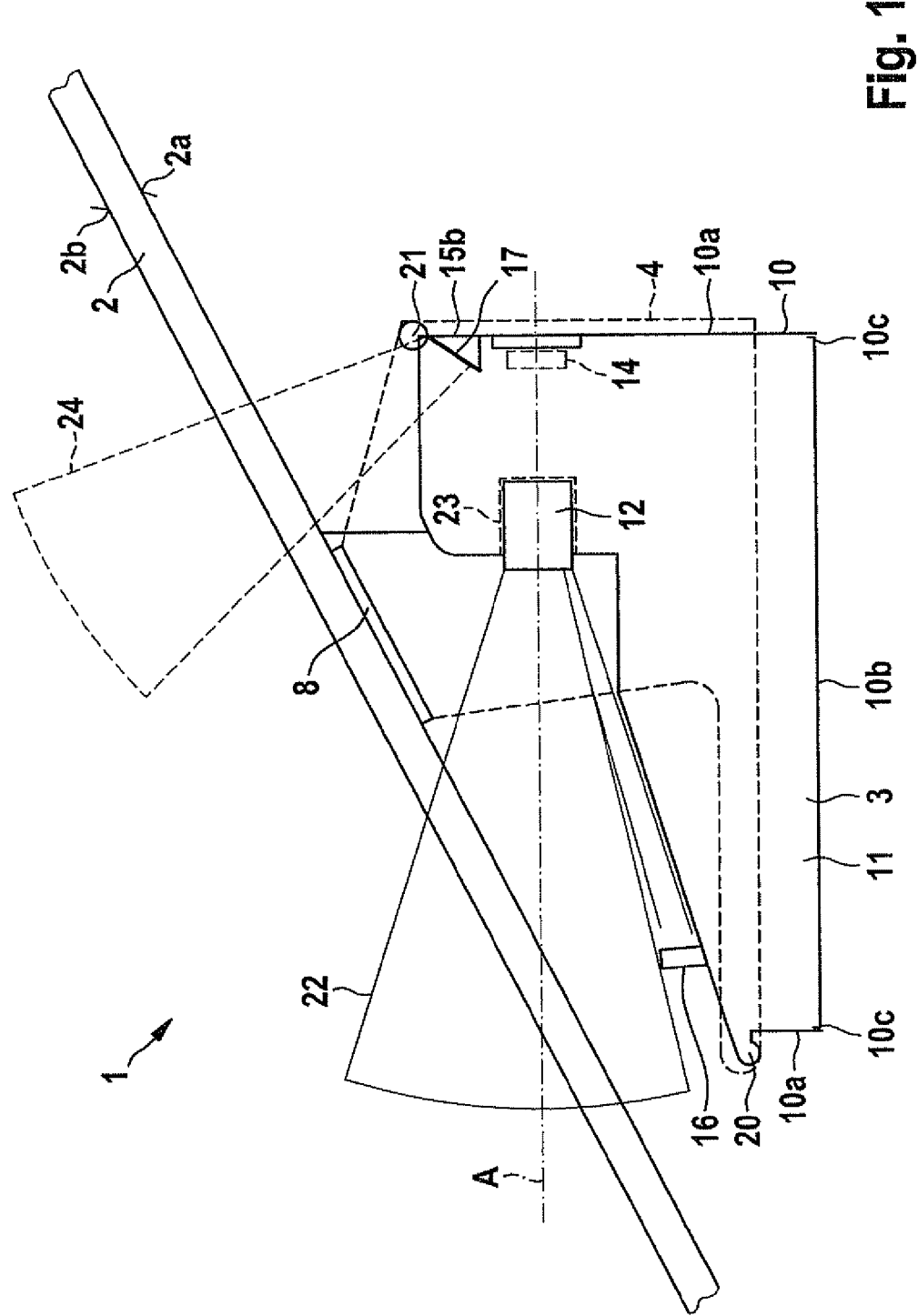
FIG. 1 shows a sectional representation of the positioning of a camera according to an example embodiment of the present invention in the vehicle.

In a vehicle 1 (not shown in greater detail) having a windshield 2, a camera 3 is fastened to a camera mount 4 suggested here by dashed lines. Camera mount 4 is fastened to windshield 2, e.g., snapped into a mounting plate 8 cemented to inside 2*a* of windshield 2. Camera mount 4 may also be a part of a mirror mount of the rear view mirror.

Camera 3 has a camera housing 10, in or on which a lens unit 12 is fastened as a camera optical element, an image sensor 14 (imager) being accommodated in housing interior 11 of camera housing 10 as an optoelectric converter which outputs image signals. Lens unit 12 may, for example, be formed by a lens holder and accommodated lenses.

Figure 2:
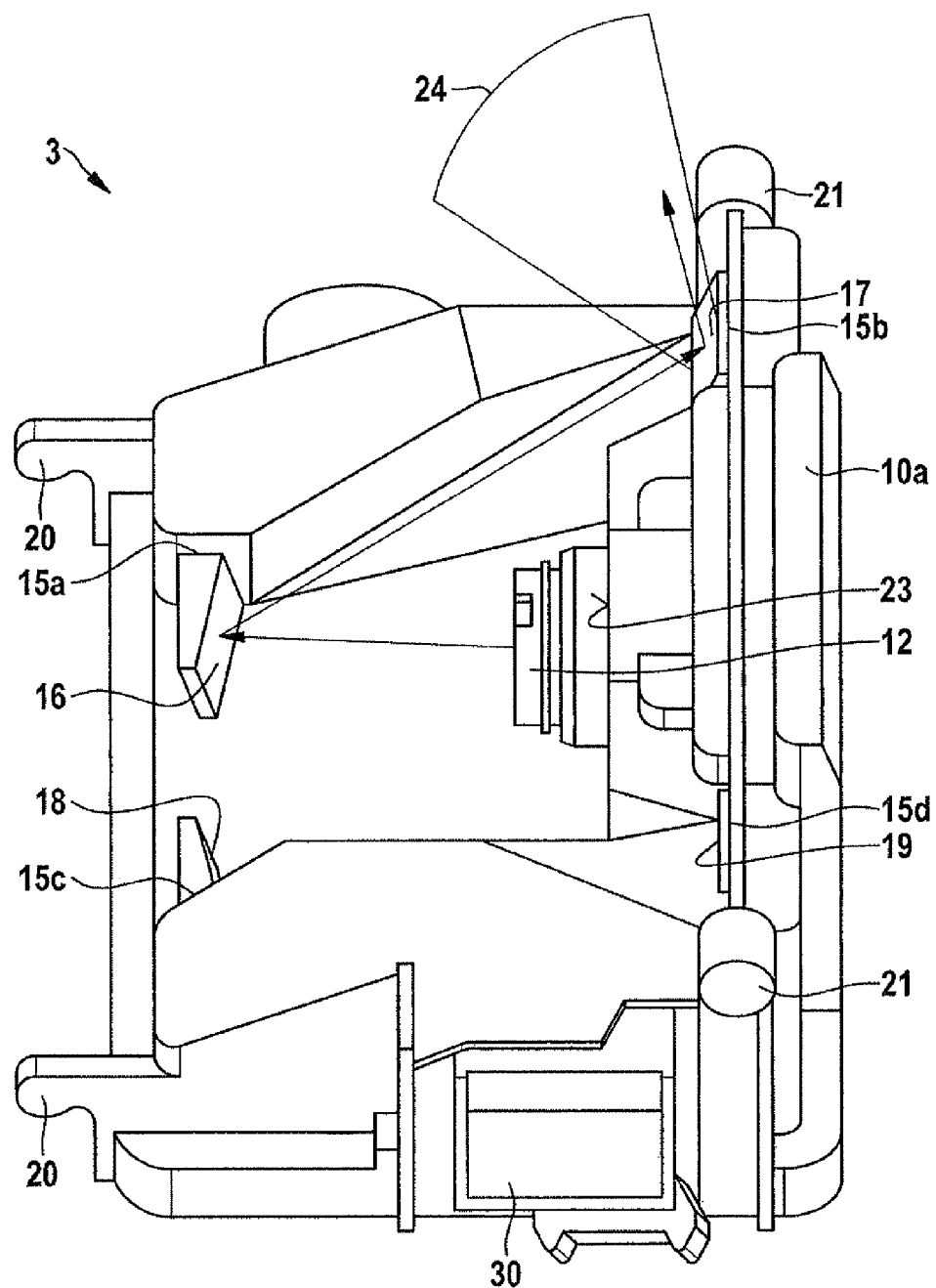
FIG. 2 shows a slightly perspective top view of the example camera according to the present invention.
Figure 3:
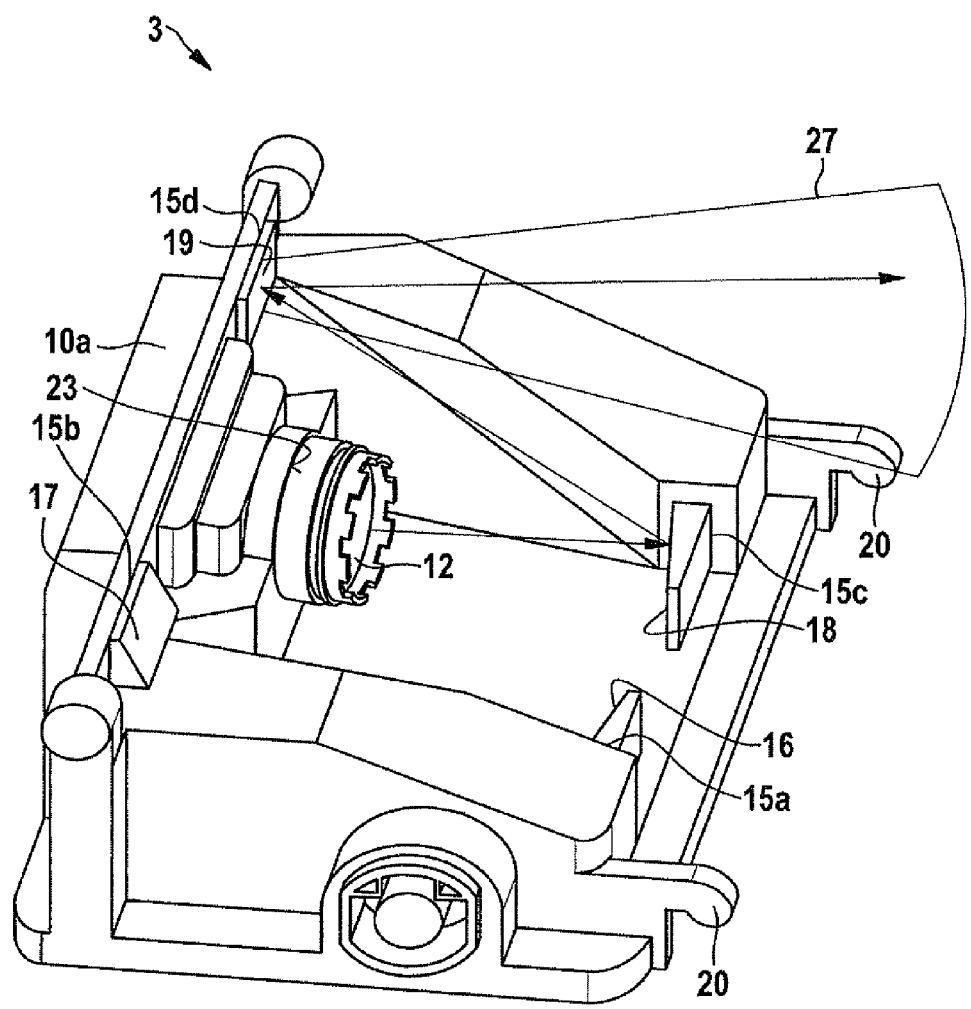
FIG. 3 shows another perspective view, angled laterally from above.
Figure 4:
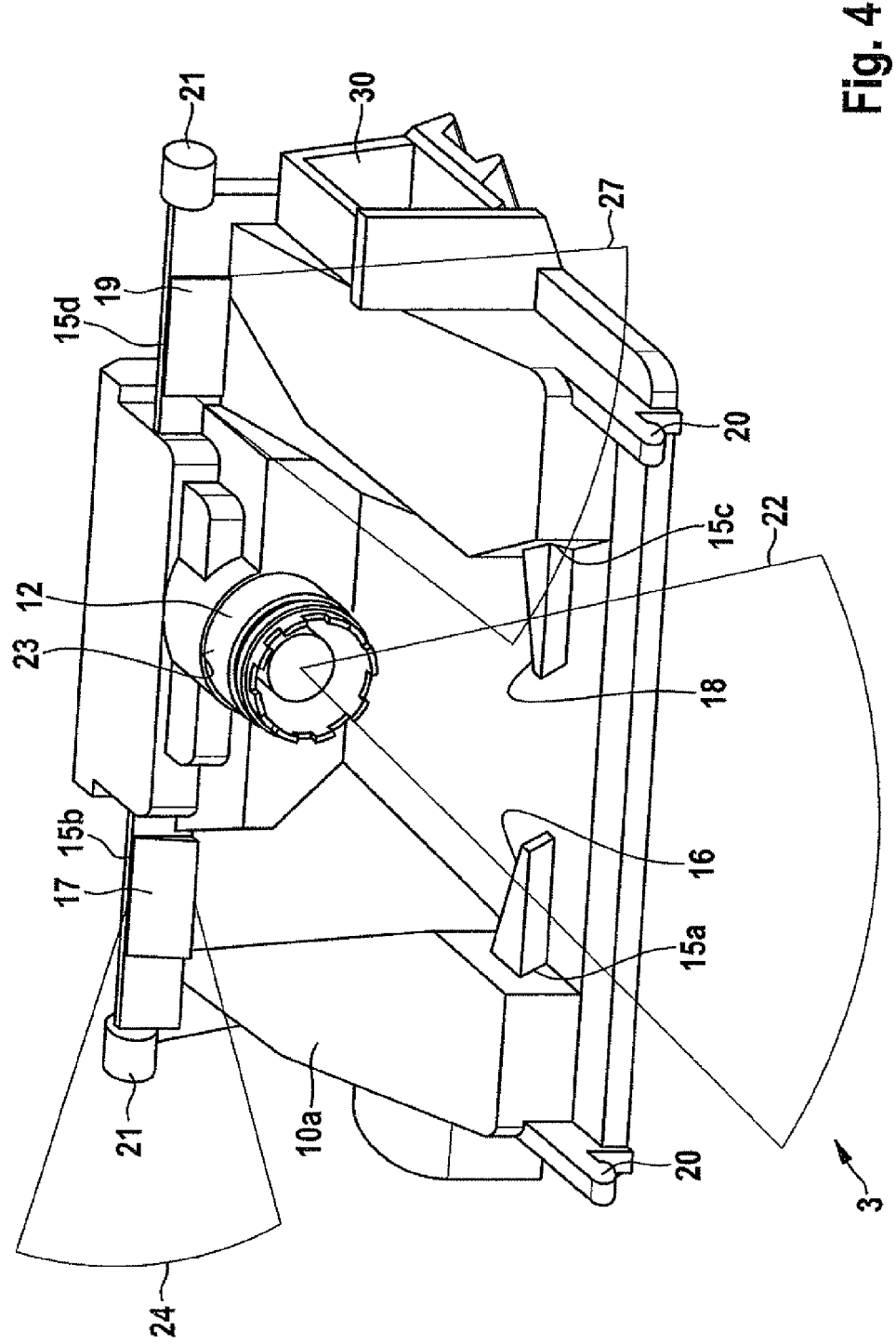
FIG. 4 shows another perspective view of the example camera, primarily from the front.

Camera housing 10 may, for example, be designed as a two-shell plastic assembly having an upper shell 10*a* and a lower shell 10*b* which are snapped together or welded to one another in connection areas 10*c*. In the perspective views of FIGS. 2, 3, 4, only upper shell 10*a* is visible. Upper shell 10*a* and lower shell 10*b* may, for example, be designed as injection molded plastic parts or compression-molded plastic parts or also as die cast parts made from a light metal such as aluminum. Housing interior 11 is sealed by camera housing 10 so as to be light-proof, preferably also dust-proof.

Receiving areas 15*a*, 15*b*, 15*c*, 15*d* are formed on upper shell 10*a*, mirrors 16, 17, 18 and 19 being provided on the receiving areas as light-guiding devices which change the detection area of camera 2, as explained in the following. Receiving areas 15*a*, 15*b*, 15*c*, 15*d* may be surfaces to which mirrors are cemented as metal strips; furthermore, receiving areas 15 a, b, c, d may also be snap-in receptacles or projections into which mirrors 16, 17, 18, 19 are snapped.

Camera mount 4 accommodates camera 3 on its camera position reference surfaces 20 and 21, which, for example, are formed at a front end and an upper end of upper shell 10*a*: An embodiment is shown in the drawings in which two laterally interspaced camera position reference surfaces 20 point downward in the form of hooks and two camera position reference surfaces 21 project laterally upward to the outside in the form of pins. The position and orientation of camera 3 is thus defined by camera position reference surfaces 20 and 21 during installation.

Furthermore, an optical mounting reference surface 23 is formed on upper shell 10*a* as, for example, a cylindrical recess, into which lens unit 12 is inserted. Optical mounting reference surface 23 thus determines the position and orientation of lens unit 12 and thus the by the image converter and optical axis A or their conically shaped primary detection area 22. Optical axis A runs, for example, horizontally or inclined downward in order to capture an external area in front of vehicle 1. Mirrors 16 and 18 lie in primary detection area 22 and accordingly guide light into lens unit 12, which is supplied by additional mirrors 17 and 19 provided, for example, at the upper and rear end of the upper shell. Mirrors 16 and 18 thus define a first secondary optical element which provides lens unit 12 with a first secondary detection area 24; correspondingly, mirrors 17 and 19 form a second secondary optical element which provides optical unit 12 with a second secondary detection area 27, which for the sake of clarity is only shown in FIG. 3 and not in FIG. 1.

According to an advantageous specific embodiment, mirrors 16 and 18 may be concave mirrors or curved mirrors, i.e., imaging mirrors, which thus act to focus or change the object width, and mirrors 17 and 19 may be planar mirrors or folding mirrors.

Folding mirrors 17 and 19 may change the optical path as a function of the desired application. Thus, for example, first secondary optical element 16, 17 may form a secondary detection area 24 having a viewing direction generally vertically upward or ahead and upward, for example, having an aperture angle of 45° upward in order to be able to measure an ambient brightness, a blurred imaging or defocusing being advantageous for achieving an averaging.

Second secondary optical element 18, 19 may make possible a viewing direction essentially ahead and a focusing onto a surface area of outer side 2b of windshield 2, in order to, for example, detect a window condition, it being in particular possible to detect wetness caused by water as a rain sensor function, dirt and/or, if necessary, additional conditions such as fogging, icing, etc. It is thus possible for primary detection area 22, for example, to be directed continuously to the object width in order to image areas in front of the vehicle distinctly on image sensor 14 and for second secondary detection area 27 to have a shorter object width.

The use of two mirrors, i.e., of imaging mirror 18 and of folding mirror 19, makes it possible to achieve a greater object width and accordingly a reduction of optical imaging errors and an increase in depth of sharpness. The use of additional mirrors, for example, additional folding mirrors on camera housing 10, may increase the object width even further.

Furthermore, a recess for a plug 30 for connecting camera 3 may be formed in upper shell 10a of camera housing 10.

What is claimed is:

1. A camera for a vehicle, comprising:
    an optoelectronic image converter;
    a camera housing, in whose interior the image converter is accommodated;
    a camera optical element accommodated in an optical mounting reference surface of the camera housing, the camera optical element provided for directly imaging a primary detection area outside of the vehicle on the image converter, and a camera position reference surface for positioning the camera in relation to a vehicle window; and
    at least one receiving surface formed on the camera housing to which at least one light-guiding device is attached for deflecting light from at least one additional detection area outside of the vehicle to the camera optical element, wherein the at least one light-guiding device includes at least two cooperating mirrors to form a secondary optical element for deflecting at least one secondary detection area to the camera optical element.

2. The camera as recited in claim 1, wherein the optical mounting reference surface, the camera position reference surface, and the at least one receiving surface are formed on a single housing component of the camera housing.

3. The camera as recited in claim 2, wherein the camera housing has an upper shell and a lower shell, and the optical mounting reference surface, the camera position reference surface, and the at least one receiving surface are formed on the upper shell.

4. The camera as recited in claim 2 wherein the housing component is one of an injection molded plastic part, a compression-molded plastic part, or a die cast metal part.

5. The camera as recited in claim 1, wherein the at least one light-guiding device is one of cemented onto or snapped into the at least one receiving surface.

6. The camera as recited in claim 1, wherein a first secondary detection area extends substantially upward for a blurred imaging of a surrounding area of a vehicle for ascertaining an ambient brightness when the camera is used in the vehicle.

7. The camera as recited in claim 1, wherein a second secondary detection area is directed to a surface area of the vehicle window for imaging the surface area on the image converter when the camera is used in the vehicle.

8. The camera as recited in claim 1, wherein the secondary optical element includes at least one folding mirror designed as a planar mirror and one imaging mirror designed as a concave mirror.

9. The camera as recited in claim 1, wherein the camera has two secondary optical elements having two mirrors each and one secondary detection area each, a first mirror of each secondary optical element being situated in the primary detection area of the camera optical element, and a second mirror of each secondary optical element being situated on a rear upper area of the camera housing in each case.

10. The camera as recited in claim 9, wherein the two first mirrors are situated in a left lower area and right lower area of the primary detection area as viewed from the camera optical element and the two second mirrors are situated interspaced to the left and right of the camera optical element as viewed from the camera optical element and behind the camera optical element.

11. The camera as recited in one of the preceding claim 1, wherein on the camera housing, a plurality of camera position reference surfaces are interspaced from one another for snap-in accommodation in a camera mount.

12. A system, comprising:
    a camera housing in whose interior the image converter is accommodated;
    a camera optical element accommodated in an optical mounting reference surface of the camera housing, the camera optical element provided for directly imaging a primary detection area outside of the vehicle on the image converter, and a camera position reference surface for positioning the camera in relation to a vehicle window;
    at least one receiving surface formed on the camera housing to which at least one light-guiding device is attached for deflecting light from at least one additional detection area outside of the vehicle to the camera optical element, wherein the at least one light-guiding device includes at least two cooperating mirrors to form a secondary optical element for deflecting at least one secondary detection area to the camera optical element; and
    a camera mount fastened to the vehicle window, the camera mount accommodating the camera on the camera position reference surfaces.

* * * * *